(12) United States Patent
Fukui et al.

(10) Patent No.: US 9,421,803 B2
(45) Date of Patent: Aug. 23, 2016

(54) IMAGE PROCESSOR AND IMAGE PROCESSING METHOD

(71) Applicant: SCREEN HOLDINGS CO., LTD., Kyoto (JP)

(72) Inventors: Kazuki Fukui, Kyoto (JP); Seiya Nomura, Kyoto (JP); Kunio Muraji, Kyoto (JP)

(73) Assignees: Screen Holdings Co., Ltd., Kyoto (JP); Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/417,776

(22) PCT Filed: Mar. 15, 2013

(86) PCT No.: PCT/JP2013/001797
§ 371 (c)(1),
(2) Date: Jan. 27, 2015

(87) PCT Pub. No.: WO2014/016988
PCT Pub. Date: Jan. 30, 2014

(65) Prior Publication Data
US 2015/0283833 A1  Oct. 8, 2015

(30) Foreign Application Priority Data
Jul. 27, 2012  (JP) .................. 2012-167031

(51) Int. Cl.
*B41J 2/36*   (2006.01)
*B41J 29/38*  (2006.01)
*H04N 1/405* (2006.01)
*B41J 2/21*   (2006.01)

(52) U.S. Cl.
CPC ............... *B41J 29/38* (2013.01); *B41J 2/2146* (2013.01); *H04N 1/4057* (2013.01)

(58) Field of Classification Search
CPC .................. B41J 29/38; B41J 2/36
USPC ................ 347/9, 40–41, 14–15, 19
See application file for complete search history.

(56) References Cited

U.S. PATENT DOCUMENTS

| | | | |
|---|---|---|---|
| 5,649,775 A * | 7/1997 | Sakuragi | G06F 17/214 400/61 |
| 6,674,546 B1 | 1/2004 | Nakahara | |
| 7,564,591 B1 | 7/2009 | Takahashi et al. | |
| 8,118,389 B2 * | 2/2012 | Sasayama | 347/14 |

FOREIGN PATENT DOCUMENTS

| | | |
|---|---|---|
| JP | 2000-196885 A | 7/2000 |
| JP | 2001-105632 A | 4/2001 |
| JP | 2004-106248 A | 4/2004 |

OTHER PUBLICATIONS

International Search Report issued in International Application No. PCT/JP2013/001797 dated May 14, 2013, with English translation.

* cited by examiner

*Primary Examiner* — Jason Uhlenhake
(74) *Attorney, Agent, or Firm* — McDermott Will & Emery LLP

(57) ABSTRACT

A screening output density corrector of an image processor corrects output densities of a plurality of types of dotted pattern data stored in a screening data storage upon printing. A dotted image data generator uses a plurality of types of the dotted pattern data subjected to the output density correction for performing screening processing to each of images, the images being represented by the continuous tone image data. Consequently, the dotted image data generator generates dotted image data of the images with the corrected output density. Accordingly, output density correction is made not to the continuous tone image data but to the dotted pattern data. Consequently, uniformity of the discharge characteristic (the number of ink droplets) is obtainable upon printing with different types of dotted pattern data. This allows prevention of unevenness in printing through the screening processing based on a plurality of types of dotted pattern data.

8 Claims, 10 Drawing Sheets

| FIGURE | NOZZLE A | NOZZLE B | CHARACTER | NOZZLE A | NOZZLE B |

OUTPUT OF NOZZLE A: 2.7 DOTS    OUTPUT OF NOZZLE A: 2.3 DOTS

OUTPUT OF NOZZLE B: 2.3 DOTS    OUTPUT OF NOZZLE B: 2 DOTS

Fig.9(a)

| 15 | 55 | 20 | 95 | 15 | 55 | 20 |
|----|----|----|----|----|----|----|
| 55 | 25 | 40 | 80 | 55 | 25 | 40 |
| 80 | 70 | 50 | 30 | 80 | 70 | 50 |
| 25 | 65 | 5  | 60 | 25 | 65 | 5  |
| 65 | 95 | 60 | 40 | 65 | 95 | 60 |
| 95 | 10 | 70 | 10 | 95 | 10 | 70 |

Fig.9(b)

30%-DOTTED PATTERN

| 15 | 55 | 20 | 95 | 15 | 55 | 20 |
|----|----|----|----|----|----|----|
| 55 | 25 | 40 | 80 | 55 | 25 | 40 |
| 80 | 70 | 50 | 30 | 80 | 70 | 50 |
| 25 | 65 | 5  | 60 | 25 | 65 | 5  |
| 65 | 95 | 60 | 40 | 65 | 95 | 60 |
| 95 | 10 | 70 | 10 | 95 | 10 | 70 |

Fig.9(c)

18%-DOTTED PATTERN

| 15 | 55 | 20 | 95 | 15 | 55 | 20 |
|----|----|----|----|----|----|----|
| 55 | 25 | 40 | 80 | 55 | 25 | 40 |
| 80 | 70 | 50 | 30 | 80 | 70 | 50 |
| 25 | 65 | 5  | 60 | 25 | 65 | 5  |
| 65 | 95 | 60 | 40 | 65 | 95 | 60 |
| 95 | 10 | 70 | 10 | 95 | 10 | 70 |

Fig.10

18% OUTPUT DOT RELATIVE TO 30% INPUT DOT

| INPUT DOT % | OUTPUT DOT % |
|---|---|
| 0 | 0 |
| ⋮ | ⋮ |
| 30 | 18 |
| ⋮ | ⋮ |
| 100 | 100 |

→

| INPUT DOT % | OUTPUT DOT % |
|---|---|
| 0 | 0 |
| ⋮ | ⋮ |
| 18 | 30 |
| ⋮ | ⋮ |
| 100 | 100 |

Fig11(a)

| 24 | 66 | 32 | 95 | 24 | 66 | 32 |
|---|---|---|---|---|---|---|
| 66 | 40 | 64 | 88 | 66 | 40 | 64 |
| 88 | 84 | 60 | 48 | 88 | 84 | 60 |
| 40 | 78 | 8 | 72 | 40 | 78 | 8 |
| 78 | 95 | 72 | 64 | 78 | 95 | 72 |
| 95 | 16 | 84 | 16 | 95 | 16 | 84 |

Fig.11(b)

30%-DOTTED PATTERN

| 24 | 66 | 32 | 95 | 24 | 66 | 32 |
|---|---|---|---|---|---|---|
| 66 | 40 | 64 | 88 | 66 | 40 | 64 |
| 88 | 84 | 60 | 48 | 88 | 84 | 60 |
| 40 | 78 | 8 | 72 | 40 | 78 | 8 |
| 78 | 95 | 72 | 64 | 78 | 95 | 72 |
| 95 | 16 | 84 | 16 | 95 | 16 | 84 |

IMAGE PROCESSOR AND IMAGE PROCESSING METHOD

RELATED APPLICATIONS

This application is the U.S. National Phase under 35 U.S.C. §371 of International Application No. PCT/JP2013/001797, filed on Mar. 15, 2013, which in turn claims the benefit of Japanese Application No. 2012-167031, filed on Jul. 27, 2013, the disclosures of which Applications are incorporated by reference herein.

TECHNICAL FIELD

The present invention relate to an image processor and an image processing for generating dotted image data by performing screening processing to continuous tone image data based on given dotted patterns.

BACKGROUND ART

Typically, with an inkjet printing apparatus, unevenness such as density unevenness or streaks may be generated in a printed image. The unevenness is caused by shapes of inkjet nozzles or a non-uniform water-repellent treatment. Accordingly, prior to actual image printing, dotted image data is printed for tests. The dotted image data is obtained by performing screening processing based on a plurality of dotted patterns with different density levels. Then, densities of the dotted image patterns printed for tests are determined, whereby nozzle shading correction is performed to a plurality of inkjet nozzles. Here, a variation in ink density occurs also during image printing, which may lead to impossible suppression of the unevenness. Consequently, an inkjet printing apparatus has been suggested that ensures to suppress unevenness in such a case above. See, for example, Patent Literature 1: Japanese Patent Publication No. 2004-106248A.

Patent Literature 1 discloses an apparatus having a pattern recorder, a density measuring unit, and an ink discharge corrector. The pattern recorder records test patterns in an external printing area of inkjet nozzles. The density measuring unit measures densities of the test patterns recorded by the pattern recorder. The ink discharge corrector corrects a discharge amount of ink droplets from each of the inkjet nozzles based on the measured values of the densities by the density measuring unit.

The apparatus having such a construction prints the test patterns prior to actual image printing, and reads the densities of the test patterns. Thereafter, the apparatus performs shading correction to the image data. Accordingly, actual printing is performed while a discharge of amount of ink droplets from each of the inkjet nozzles is corrected. In other words, the correction is made based on the densities immediately before the printing. This ensures to suppress unevenness in the printed image.

Patent Literature 1

Japanese Patent Publication No. 2004-106248A

SUMMARY OF THE INVENTION

Technical Problem

However, the example of the currently-used apparatus with the above construction has the following problem. That is, the currently-used apparatus possesses a problem that unevenness is unavoidable at a boundary between different dotted patterns upon printing through the screening processing based on a plurality of dotted patterns. For instance, when large dots are used as dotted patterns for characters and small dots are used as dotted patterns for pictures, unevenness occurs at a boundary between the large and small dots.

The present invention has been made regarding the state of the art noted above, and its one object is to provide an image processor and an image processing method that allow prevention of unevenness by correcting dotted patterns even when printing is performed through screening processing based on a plurality of types of dotted patterns.

Solution to Problem

The present invention is constituted as stated below to achieve the above object. One embodiment of the present invention according to claim 1 discloses an image processor for generating dotted image data by performing screening processing for forming dots to continuous tone image data. The image processor includes a screening data storage device, a screening output density correcting device, and a dotted image data generating device. The screening data storage device stores a plurality of types of dotted pattern data for use in the screening processing. The screening output density correcting device performs output density correction to the plurality of types of dotted pattern data upon printing. The dotted image data generating device generates dotted image data with a corrected output density from the continuous tone image data by performing the screening processing to each of a plurality of images represented by the continuous tone image data using the plurality of types of dotted pattern data subjected to the output density correction.

Operation and Effect

With the embodiment of the present invention according to claim 1, the screening output density correcting device performs the output density correction to a plurality of types of dotted pattern data stored in the screening data storage device upon printing. Then, the dotted image data generating device generates the dotted image data with the corrected output density by performing the screening processing to each of a plurality of images represented by the continuous tone image data using a plurality of types of dotted pattern data subjected to the output density correction. Accordingly, output density correction is made not to the continuous tone image data but to the dotted pattern data. Consequently, uniformity of discharge characteristics (the number of ink droplets) is obtainable upon printing with different types of dotted pattern data. This allows prevention of unevenness even upon printing through the screening processing based on a plurality of types of dotted pattern data.

Moreover, it is preferable in the present invention that the screening output density correcting device multiplies a threshold of each of pixels set in the dotted pattern data by a nozzle shading coefficient (claim 2).

Multiplying the threshold of each of the pixels in the dotted pattern data by the nozzle shading coefficient achieves the output density correction to the dotted pattern data.

Moreover, it is preferable in the present invention that the screening output density correcting device performs the correction to dotted pattern data corresponding to only a part of the continuous tone image data while shifting the dotted pattern data over the continuous tone image data entirely (claim 3).

Here, the dotted pattern data corresponding to a part of the continuous tone image data is corrected while the dotted pattern data is shifted successively over the continuous tone image data entirely. Consequently, rapid processing with reduced load is obtainable. In addition, a storage area used at one time is increased, achieving cost reduction.

Another embodiment of the present invention according to claim 4 discloses an image processing method for generating dotted image data by screening processing for forming dots to continuous tone data. The method includes a screening output density correcting step of performing output density correction to a plurality of types of dotted pattern data for use in the screening processing upon printing, and a dotted image data generating step of generating dotted image data with a corrected output density from the continuous tone image data by performing the screening processing to each of a plurality of images represented by the continuous tone image data using the plurality of types of dotted pattern data subjected to the output density correction.

Operation and Effect

With the embodiment of the present invention according to claim 4, the output density correction is performed to a plurality of types of dotted pattern data upon printing in the screening output density correcting step. In the dotted image data generating step, the dotted image data with the corrected output density is generated by performing the screening processing to each of a plurality of images represented by the continuous tone image data using a plurality of types of dotted pattern data subjected to the output density correction. Accordingly, output density correction is made not to the continuous tone image data but to the dotted pattern data. Consequently, uniformity of discharge characteristics (the number of ink droplets) is obtainable upon printing with different types of dotted pattern data. This allows prevention of unevenness even upon printing through the screening processing based on a plurality of types of dotted pattern data.

Advantageous Effects of Invention

With the image processor according to the embodiments of the present invention, the screening output density correcting device performs the output density correction to a plurality of types of dotted pattern data stored in the screening data storage device upon printing. Then, the dotted image data generating device generates the dotted image data with the corrected output density by performing the screening processing to each of a plurality of images represented by the continuous tone image data using a plurality of types of dotted pattern data subjected to the output density correction. Accordingly, output density correction is made not to the continuous tone image data but to the dotted pattern data. Consequently, uniformity of discharge characteristics (the number of ink droplets) is obtainable upon printing with different types of dotted pattern data. This allows prevention of unevenness even upon printing through screening processing based on a plurality of types of dotted pattern data.

BRIEF DESCRIPTION OF DRAWINGS

FIG. 9 is a schematic view of dotted pattern data, FIG. 9(a) illustrating mask dotted pattern data, FIG. 9(b) illustrating 30%-dotted pattern data, and FIG. 9(c) illustrating 18%-dotted pattern data.

FIG. 10 is a schematic view illustrating output density correction to the dotted pattern data.

FIG. 11 is a schematic view of the dotted pattern data, FIG. 11(a) illustrating dotted pattern data subjected to the output density correction, and FIG. 11(b) illustrating 30%-dotted pattern data.

DESCRIPTION OF EMBODIMENTS

Figure 1:
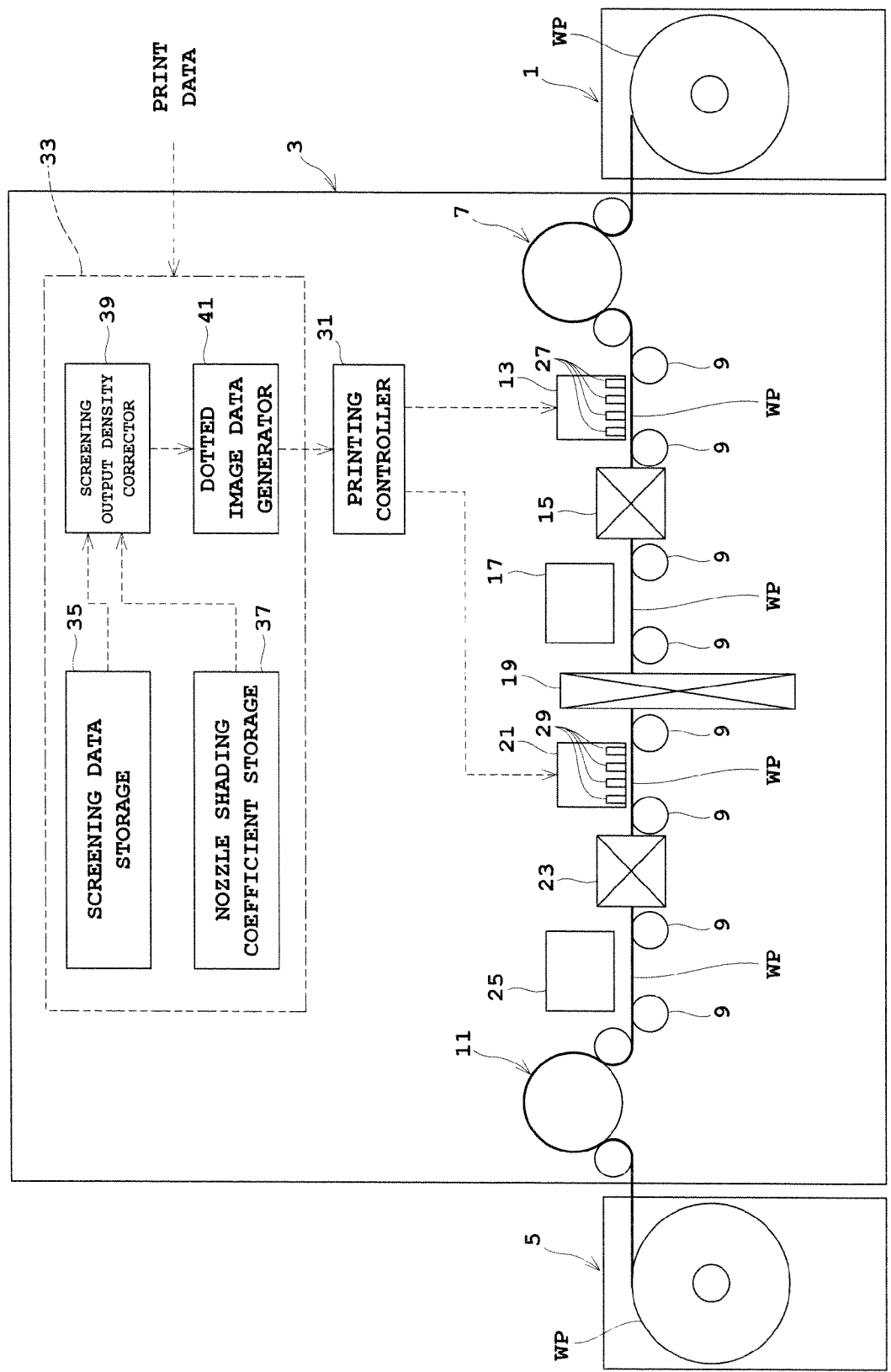
FIG. 1 is a block diagram illustrating an overall construction of an inkjet printing system with an image processor according to one embodiment.

The following describes embodiments of the present invention with reference to drawings. FIG. 1 illustrates an overall construction of an inkjet printing system with an image processor according to one embodiment of the present invention.

The inkjet printing system includes a paper feeder 1, an inkjet printing apparatus 3, and a take-up roller 5.

The paper feeder 1 holds web paper WP wound in a roll form rotatably around a horizontal axis. The paper feeder 1 unwinds out and supplies the web paper WP to the inkjet printing apparatus 3. The inkjet printing apparatus 3 prints the web paper WP. The take-up roller 5 winds up the web paper WP printed with the inkjet printing apparatus 3 around the horizontal axis. Regarding the side from which the web paper WP is fed as upstream and the side to which the web paper WP is discharged as downstream, the paper feeder 1 is disposed upstream of the inkjet printing apparatus 3, whereas the take-up roller 5 is disposed downstream of the inkjet printing apparatus 3.

The inkjet printing apparatus 3 includes a drive roller 7 in an upstream position thereof. The drive roller 7 takes the web paper WP from the paper feeder 1. The web paper WP unwound from the paper feeder 1 by the drive roller 7 is transported downstream toward the take-up roller 5 on a plurality of transport rollers 9. A drive roller 11 is disposed between the most downstream transport roller 9 and the take-up roller 5. The drive roller 11 feeds the web paper WP travelling on transport rollers 9 toward the take-up roller 5.

Between the drive roller 7 and the drive roller 11, the inkjet printing apparatus 3 includes a front-face printer 13, a front-face drier 15, a front-face inspector 17, an inversion unit 19, a rear-face printer 21, a rear-face drier 23, and a rear-face inspector 25. These are provided in this order. Here, the terms "front-face" and the "rear-face" in this embodiment refer to a printed surface of the web paper WP to be printed firstly and a printed surface of the web paper WP to be printed next, respectively.

The front-face printer 13 includes a printing head 27 for discharging ink droplets. The printing head 27 includes a plurality of nozzle arranged orthogonally to the transport direction of the web paper WP. A plurality of front-face printers 13 are typically arranged in the transportation direction of the web paper WP. For instance, four printers 13 are provided separately for black (K), cyan (C), magenta (M), and yellow (Y). However, in order to facilitate understanding of the invention, the following description will be given on the assumption that only one printer 13 is provided. The same is applied to the rear-face printer 21 mentioned later.

The front-face drier 15 dries a front face of the web paper WP with the discharged ink droplets being printed thereon. The front-face drier 15 includes a heat drum not shown. The rear face of the web paper WP contacts the heat drum, whereby the ink droplets on the front face of the web paper WP are dried.

The front-face inspector 17 inspects the printed image for any stains or missing. The front-face inspector 17 includes a camera or an optical system through which the web paper WP travelling immediately below the front-face inspector 17 is imaged, and outputs the resultant as a front-face inspected image.

The inversion unit 19 reverses the web paper WP transported with the front face thereof being directed upward. In other words, the inversion unit 19 reverses the web paper WP so as for the rear face of the web paper WP to be directed upward.

Similar to the front-face printer 13, the rear-face printer 21 includes a printing head 29. The printing head 29 has the same construction as the printing head 27 of the front-face printer 13.

The rear-face drier 23 has the same construction as the front-face drier 15. The rear-face drier 23 dries the rear face of the web paper WP. The rear-face inspector 25 has the same construction as the front-face inspector 17. The rear-face inspecting unit 25 inspects the rear face of the web paper WP for any stains or missing. Specifically, the rear-face inspector 25 includes a camera or an optical system through which the web paper WP travelling immediately below the surface inspector 17 is imaged and outputs the resultant as a front-face inspected image.

Moreover, the inkjet printing apparatus 3 includes a printing controller 31 and an image processor 33. The printing controller 31 receives image data (dotted image data with a corrected output density, which is to be mentioned later) from the image processor 33. The printing controller 31 performs operation to the drive rollers 7 and 11, the front-face printer 13, and the rear-face printer 21 depending on printing of the front-face printed image data and the rear-face printed image data contained in the image data. The image processor 33 receives print data (continuous tone image data) from an external computer. The print data contains the front-face printed image data and the rear-face printed image data. The image processor 33 processes print data into the dotted image data with the corrected output density, mentioned later, and outputs the dotted image data to the printing controller 31. The image processor 33 includes a screening data storage 35, a nozzle shading coefficient storage 37, a screening output density corrector 39, and a dotted image data generator 41.

Here, the screening data storage 35 corresponds to the "screening data storage device" in the present invention. The screening output density corrector 39 corresponds to the "screening output density correcting device" in the present invention. The dotted image data generator 41 corresponds to the "dotted image data generating device" in the present invention.

The screening data storage 35 stores a plurality of types of dotted pattern data in order to form dots. Examples of a plurality of types of dotted pattern data include dotted pattern data for converting "figures" into dots or dotted pattern data for converting "characters" into dots. In this embodiment, two types of dotted pattern data, i.e., dotted pattern data for figures and for characters are both stored. The two dotted pattern data is stored in a necessity minimum tile unit. When used for the following processes, the dotted pattern data is preferably read out in the tile unit as needed.

The nozzle shading coefficient storage 37 stores a nozzle shading coefficient for eliminating unevenness in discharge characteristic among the of nozzles. This is to be mentioned later.

The screening output density corrector 39 corrects output densities of the two types of dotted pattern data in the screening data storage 35 upon printing with the inkjet printing apparatus 3.

The dotted image data generator 41 performs screening processing to each of a plurality of images (e.g., patterns such as figures and characters) represented by the print data using the two types of dotted pattern data subjected to output density correction. Accordingly, dotted image data with the corrected output density is generated from the print data as the continuous tone image data. The generated dotted image data with the corrected output density is transmitted to the printing controller 31.

Figure 2A:
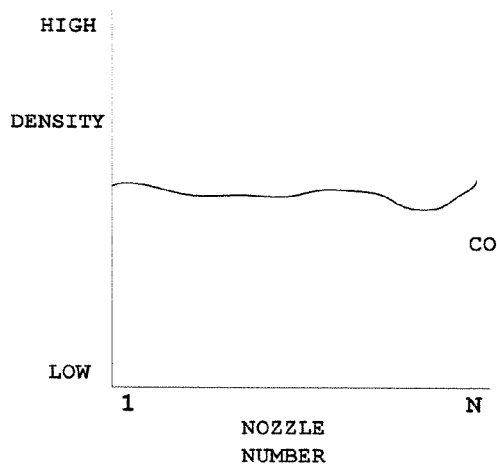
FIGS. 2(a) and (b) are schematic views each illustrating nozzle shading correction.
Figure 2B:
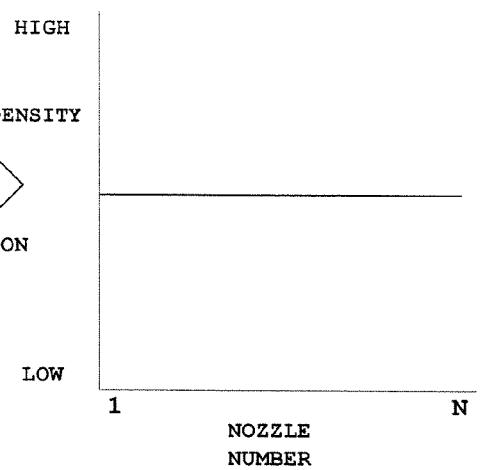
Figure 3:
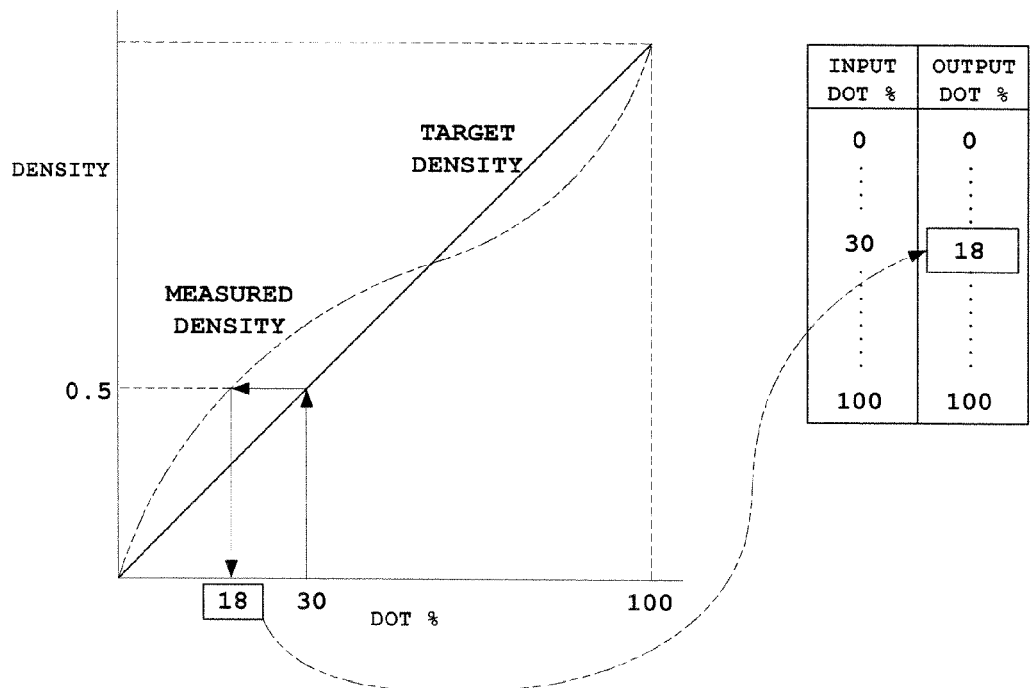
FIG. 3 is a schematic view illustrating a relationship and correction of an output density relative to input dots.
Figure 4A:
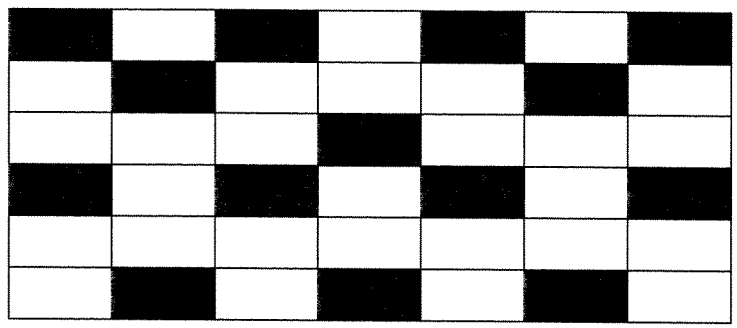
FIG. 4 is a schematic view of printed results with dotted pattern data, FIG. 4(a) illustrating 30%-dotted pattern data, and FIG. 4(b) illustrating 18%-dotted pattern data.
Figure 4B:
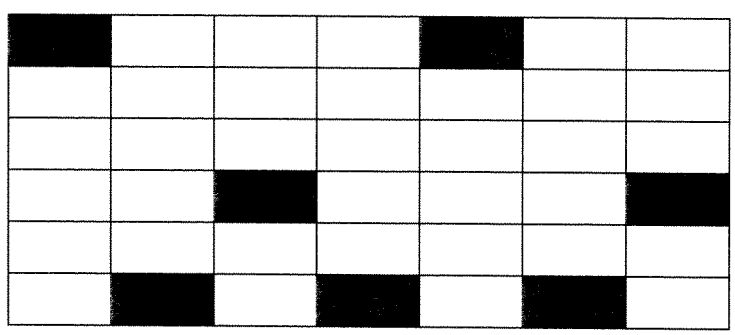

Now reference is made to FIGS. 2 to 4. FIGS. 2(a) and 2(b) are schematic views each for illustrating nozzle shading correction. FIG. 3 is a schematic view for illustrating a relationship and correction of an output density relative to input dots. FIG. 4 is a schematic view of the printed results with the dotted pattern data, FIG. 4(a) illustrating 30%-dotted pattern data and FIG. 4(b) illustrating 18%-dotted pattern data.

The above printing head 27 (as well as the printing head 29) each includes a plurality of nozzles arranged in a primary scanning direction orthogonal to the transportation direction of the web paper WP. If a plurality of nozzles all has the same discharge characteristic, applying the same signals to the nozzles achieves the same ink density upon printing. However, in actual, a plurality of nozzles has a variation in discharge characteristic. Accordingly, as illustrated in FIG. 2(a), the nozzles have a variation in density. Then, test patterns by dotted pattern data with a plurality of densities (e.g., six types of patterns, i.e., 100%, 80%, 60%, 40%, 20%, and 5%) are printed on the web paper WP, and thereafter the front-face inspector 17 (or the rear-face inspector 25) images the test patterns. The densities of the nozzles are each read from the imaged test patterns. Then, nozzle shading coefficients are determined for correction to obtain the same density among all the nozzles.

FIG. 3 illustrates one example of generating a dotted percentage of output relative to one of input so as for a nozzle to have a 0.5 output density with a 30%-density test pattern. FIG. 3 illustrates a characteristic line by a solid line as a target density. However, in actual, a characteristic curve is generated with a non-linear relationship between input and output, as illustrated by chain double-dashed lines. Consequently, when a 30%-density test pattern is printed, a density thereof is determined by shifting an intersection with the characteristic curve leftward in a horizontal direction, the characteristic curve being indicated by the chain double-dashed lines. That is, the density exceeds the target density of 0.5. FIG. 3 explicitly illustrates the feature that a 18%-dotted pattern is preferably applied for obtaining a target density of 0.5. The above nozzle shading coefficient storage 37 stores such a relationship of the characteristic curve in a table form or a cubic function. FIG. 4(a) illustrates the printed result with 30%-dotted pattern data. FIG. 4(b) illustrates the printed result with 18%-dotted pattern data. With the 30%-dotted pattern data, once ink droplet is applied for every three pixels. With the 18% dotted pattern data, once ink droplet is applied for every five pixels. Accordingly, printing is to be performed actually with the 18%-dotted pattern data (FIG. 4(b)), not with the 30%-dotted pattern data (FIG. 4(a)), for the above nozzle shading correction. Moreover, it is general to apply ink droplets in different positions between the figures and characters even using the dotted pattern data with the same density.

Now reference is made to FIGS. 5 to 8 for describing a problem upon printing with different types of dotted pattern data.

Figure 5:
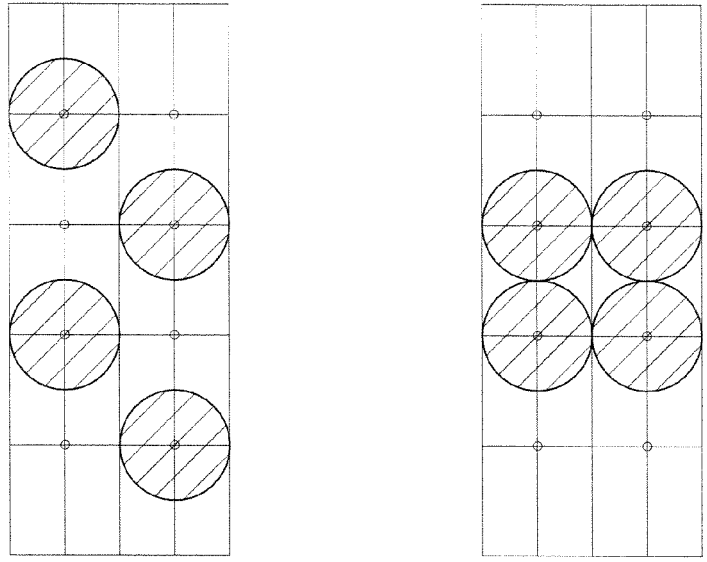
FIG. 5 is a schematic view of an enlarged ideal printed result with different types of dotted pattern data.
Figure 6:
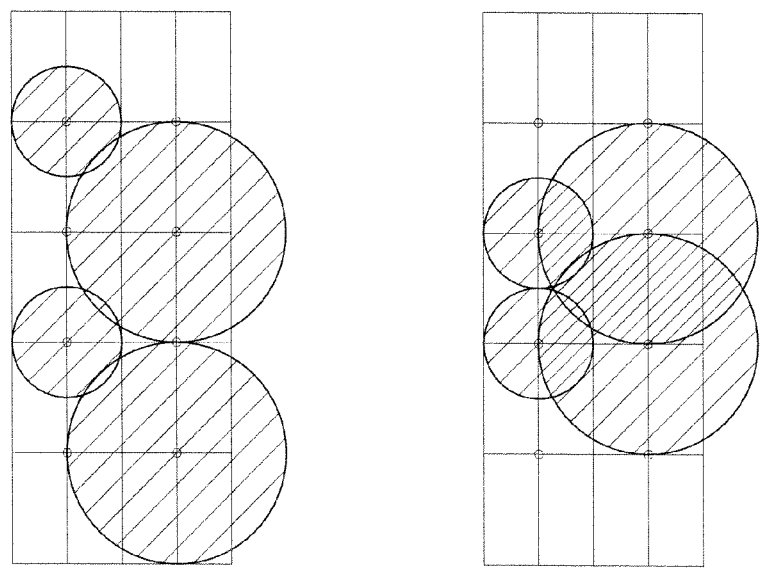
FIG. 6 is a schematic view of an enlarged actual printed result with the different types of dotted pattern data.
Figure 7:
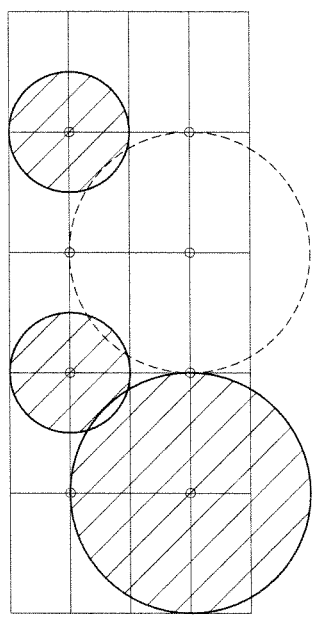
FIG. 7 is a schematic view of an enlarged printed result with the different types of dotted pattern data through the nozzle shading correction.
Figure 7:
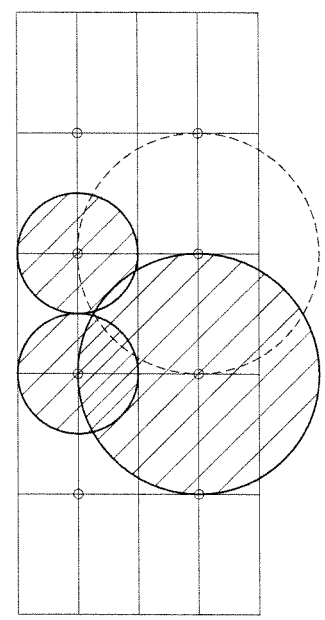
Figure 8:
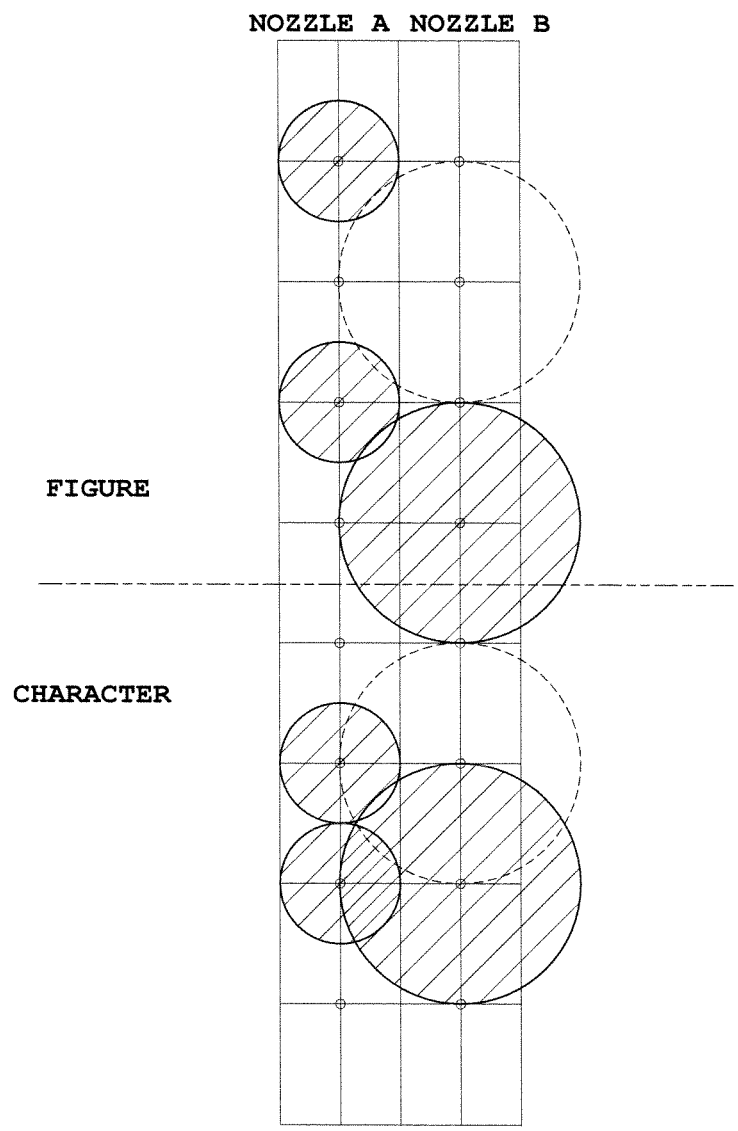
FIG. 8 is a schematic view illustrating the results of FIG. 7 arranged adjacent to each other for explanation of a possible problem.

FIG. 5 is an enlarged schematic view of the ideal printed results with different types of dotted pattern data. FIG. 6 is an enlarged schematic view of the actual printed results with the different types of dotted pattern data. FIG. 7 is an enlarged schematic view of the printed results with the different types of dotted pattern data through nozzle shading correction. FIG. 8 is a schematic view of the results of FIG. 7 arranged adjacent to each other for explanation of a problem to occur.

FIG. 5 illustrates on the left thereof a printing result with the dotted pattern data pattern for figures. Here, it is assumed that both nozzles A and B apply 2 dots, respectively, in a zigzag manner. FIG. 5 illustrates on the right thereof a printing result with the dotted pattern data for characters. Here, it is assumed that both the nozzles A and B apply 2 dots, respectively, adjacent to each other. In such ideal printed results, 2 dots are applied in positions of the nozzles A and B, respectively, for eight ink droplet positions with the dotted pattern data for figures and the dotted pattern data for characters. That is, a total of 4 dots are applied.

FIG. 5 illustrates the ideal results. Here, it is assumed that the nozzle B has a superior discharge characteristic to that of the nozzle A and thus discharges larger ink droplets. Accordingly, in the dotted pattern data for figures (on the left of FIG. 6), approximately 3.4 dots are applied in the positions of the nozzles A by influence of the nozzles B, and approximately 4.6 dots are applied on the positions of the nozzles B. Moreover, in the dotted pattern data for characters (on the right of FIG. 6), approximately 2.5 dots are applied in the positions of the nozzles A by the influence of the nozzles B, and approximately 3.2 dots are applied in the positions of the nozzles B.

Then, the "image data" is multiplied by the nozzle shading coefficient mentioned above for correction to obtain uniform discharge characteristics. In the correction, one of the nozzles B applies no ink droplet. FIG. 7 illustrates the results in this case. Here, with the dotted pattern data for figures (on the left of FIG. 7), approximately 2.7 dots are applied in the positions of the nozzles A and approximately 2.3 dots are applied in the positions of the nozzles B. Moreover, with the dotted pattern data for characters (on the right of FIG. 7), approximately 2.3 dots are applied in the positions of the nozzles A and approximately 2 dots are applied in the positions of the nozzles B. As noted above, using the nozzle shading correction achieves ink droplets of approximately 2 dots from the nozzles A and B, respectively, which is ideal upon printing.

The following describes the case when the printed results with the dotted pattern data for figures and characters are adjacent to each other. For instance, it is assumed that the printed result with the dotted pattern data for characters is disposed adjacently below the printed result with the dotted pattern data for figures. This is illustrated in FIG. 8. In a printed area with the dotted pattern data for figures and a printed area with the dotted pattern data for characters, approximately 2.7 dots and 2.3 dots are applied in the positions of the nozzles A, respectively, and approximately 2.3 dots and 2 dots are applied in the positions of the nozzles B, respectively. As the result, unevenness is visible at a boundary of the printed areas. The present invention aims to suppress unevenness occurring in this way.

The following describes the above dotted pattern data and output density correction to the dotted pattern data with reference to FIGS. 9 to 11. FIG. 9 illustrates a schematic view of dotted pattern data. FIG. 9(a) illustrates mask dotted pattern data, FIG. 9(b) illustrates 30%-dotted pattern data, and FIG. 9(c) illustrates 18%-dotted pattern data. FIG. 10 is a schematic view for explanation of output density correction to the dotted pattern data. FIG. 11 is a schematic view of dotted pattern data. FIG. 11(a) illustrates dotted pattern data subjected to the output density correction, and FIG. 11(b) illustrates 30%-dotted pattern data.

The dotted pattern data in the embodiment is constituted by necessity minimum tile units, as in FIG. 9(a), that are sufficiently smaller than the image data. For instance, the dotted pattern data in this embodiment is formed by 6 by 7 pixels. Moreover, the dotted pattern data is provided for each type of images (e.g., for figures and characters). Each of the pixels in the dotted pattern data has an appropriate threshold for each type of images (e.g., for figures and characters). For instance, when a tone in an area to which the image data is printed has a density obtained with 30%-dotted pattern data, each of the pixels in the dotted pattern data is compared with a value of 30(%). Then, ink droplets are applied to positions of pixels each having an pixel value equal to or less than the value of 30. FIG. 9(b) schematically illustrates the above. FIG. 9(c) illustrates one example for 18%-dotted pattern data.

The screening output density corrector 39 corrects output densities of two types of dotted pattern data upon printing. Specifically, the two types of dotted pattern data are multiplied by a nozzle shading coefficient. This means changing the threshold of each of the pixels in the dotted pattern data. For instance, for setting 18%-dotted output relative to 30%-dotted input, a process is performed in such a manner that the characteristic line in FIG. 3 is reversed with a line of y=x. Specifically, as illustrated in FIG. 10, the input is replaced with the output. FIG. 11(a) illustrates one example of the dotted pattern data in the above case. FIG. 11(b) illustrates one example for 30%-dotted pattern data of the dotted pattern data.

As noted above, output density of the dotted pattern data is corrected by multiplying the dotted pattern data by the nozzle shading coefficient. This achieves uniformity of the discharge characteristic (the number of ink droplets per unit area) upon printing with different types of dotted pattern data. Consequently, unevenness is avoidable at the boundary of different images.

Figure 12:
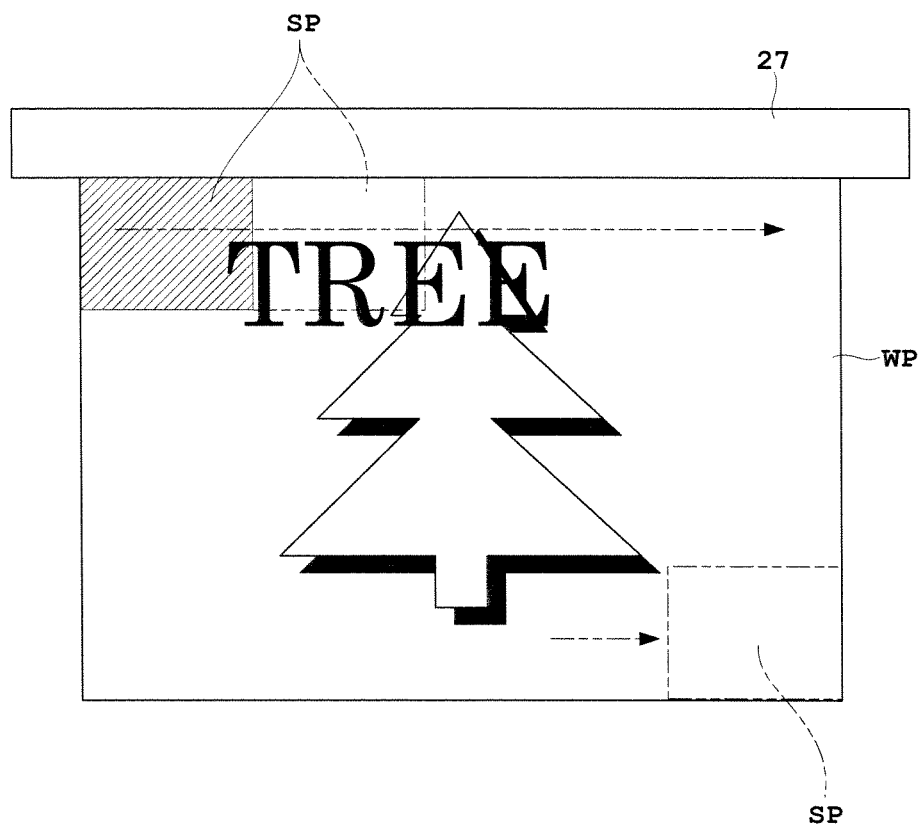
FIG. 12 is a schematic view for explanation of printing.
Figure 13:
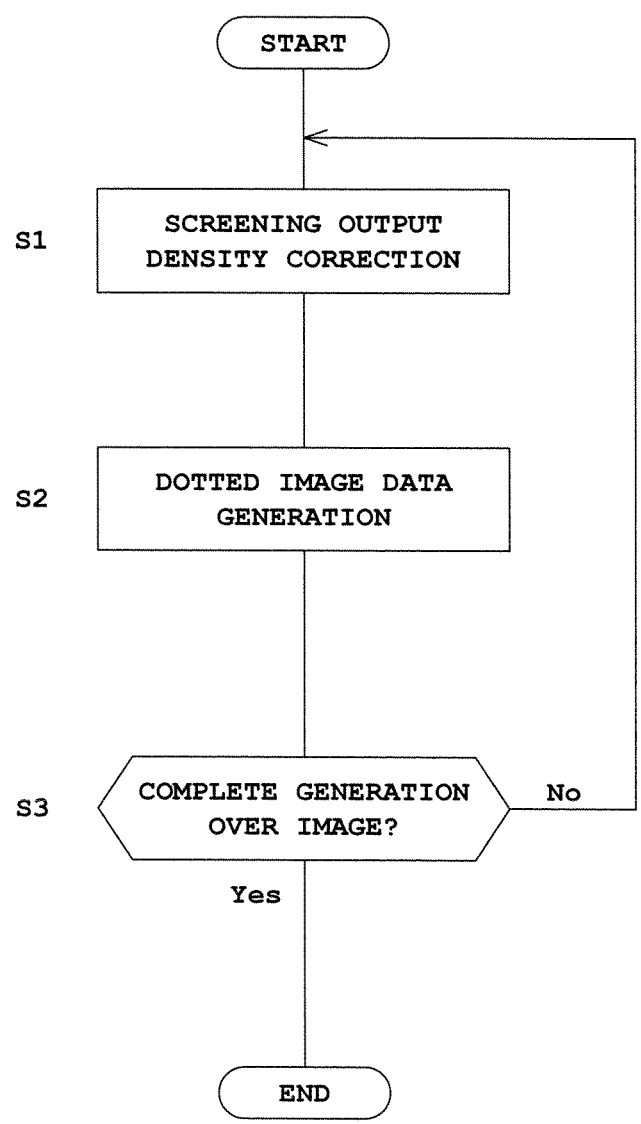
FIG. 13 is a flow chart illustrating operation of the image processor.

The following describes operation of the image processor upon printing the continuous tone image data with reference to FIGS. 12 and 13. FIG. 12 is a schematic view for explanation of printing. FIG. 13 is a flow chart of operation of the image processor. Here, the following describes only the case of performing printing to a front face with the front-face printer 13. In addition, image data contains a partially superimposed portion of a character "TREE" on a tree figure.

Step S1 (Screening Output Density Correcting Step)

The image processor 33 receives print data as the continuous tone image data. The screening output corrector 39 corrects a screening output density. The screening output corrector 39 corrects the output density of dotted pattern data SP in a tile unit from two types of dotted pattern data stored in the screening data storage 35, the dotted pattern data SP corresponding to an image (figures and characters) of a print area. The area is printed toward the primary scanning direction as illustrated by chain double-dashed lines with an arrow in FIG. 12. The area is successively shifted upstream in a paper-feed direction.

Step S2 (Dotted Image Data Generating Step)

The dotted image data generator 41 generates dotted image data with the corrected output density by performing screening depending on the image of the print data using the dotted pattern data SP subjected to the output density correction in a tile unit. The dotted pattern data SP is generated by the screening output density corrector 39. The dotted image data generator 41 transmits the generated dotted image data with the corrected output density to the printing controller 31.

Step S3

Division of the process is determined by whether or not the dotted image data with the corrected output density is completely generated over the image. When the generation is completed over the image, the process ends. On the other hand, when the generation is not completed over the image, the process returns to the step S1 where output density of dotted pattern data in a tile unit in a next printing area is corrected upon printing.

With the embodiment, the screening output density corrector 39 corrects output densities of a plurality of types of dotted pattern data stored in the screening data storage 35 upon printing. The dotted image data generator 41 uses a plurality of types of the dotted pattern data subjected to the output density correction for performing screening to each of images, the images being represented by the continuous tone image data. Consequently, the dotted image data generator 41 generates dotted image data of the images with the corrected output density. Accordingly, output density correction is made not to the continuous tone image data but to the dotted pattern data. Consequently, uniformity of the discharge characteristic (the number of ink droplets) is obtainable upon printing with different types of dotted pattern data. This allows prevention of unevenness even using a plurality of types of dotted pattern data.

Here, the dotted pattern data corresponding to a part of the continuous tone image data is corrected while being shifted successively over the continuous tone image data entirely. Consequently, rapid processing with reduced load is obtainable. In addition, a storage area used at one time is increased, achieving cost reduction.

The present invention is not limited to the foregoing examples, but may be modified as follows.

(1) In the embodiments mentioned above, printing is performed while the dotted pattern data SP is shifted. The dotted pattern data SP is in the necessity minimum tile unit corresponding to a part of the print data. Alternately, in the present invention, the unit of the dotted pattern data may be an area corresponding to the total number of nozzles arranged in the primary scanning direction of the printing head 27 (printing head 29).

(2) In the embodiments mentioned above, figures and characters are described as one example of various types of images contained in the continuous tone image data. Alternately, the continuous tone image data containing other types of images can achieve the same effect.

INDUSTRIAL APPLICABILITY

As noted above, the present invention is suitable for an image processor and an image processing method of generating dotted image data.

REFERENCE SIGNS LIST

3 . . . inkjet printing apparatus
WP . . . web paper
27 . . . printing head
31 . . . printing controller
33 . . . image processor
35 . . . screening data storage
37 . . . nozzle shading coefficient storage
39 . . . screening output density corrector
41 . . . dotted image data generator
SP . . . dotted pattern data in a tile unit

The invention claimed is:

1. An image processor for generating dotted image data by performing screening processing for forming dots to continuous tone image data, the image processor comprising:
   a screening data storage device storing a plurality of types of dotted pattern data for use in the screening processing to each of a plurality of images represented by the continuous tone image data;
   a screening output density correcting device performing output density correction to the plurality of types of dotted pattern data when the continuous tone image data is processed for printing; and
   a dotted image data generating device generating dotted image data with a corrected output density from the continuous tone image data by performing the screening processing to each of the plurality of images represented by the continuous tone image data using the plurality of types of dotted pattern data subjected to the output density correction.

2. The image processor according to claim 1, wherein the screening output density correcting device multiplies a threshold of each of pixels set in the dotted pattern data by a nozzle shading coefficient.

3. The image processor according to claim 2, wherein the screening output density correcting device performs the correction to dotted pattern data corresponding to only a part of the continuous tone image data while shifting the dotted pattern data over the continuous tone image data entirely.

4. The image processor according to claim 1, wherein the screening output density correcting device performs the correction to dotted pattern data corresponding to only a part of the continuous tone image data while shifting the dotted pattern data over the continuous tone image data entirely.

5. An image processing method for generating dotted image data by screening processing for forming dots to continuous tone data, the method comprising:
   performing screening output density correction to a plurality of types of dotted pattern data for use in the screening processing upon printing to each of a plurality of images represented by the continuous tone image data; and generating dotted image data with a corrected output density from the continuous tone image data by performing the screening processing to each of the plurality of images represented by the continuous tone image data using the plurality of types of dotted pattern data subjected to the output density correction.

6. The image processing method according to claim 5, wherein
the performing screening output density correction includes multiplying a threshold of each of pixels set in the dotted pattern data by a nozzle shading coefficient.

7. The image processing method according to claim 6, wherein
the performing screening output density correction includes correcting dotted pattern data corresponding to only a part of the continuous tone image data while the dotted pattern data is shifted over the continuous tone image data entirely.

8. The image processing method according to claim 5, wherein
the performing screening output density correction includes correcting dotted pattern data corresponding to only a part of the continuous tone image data while the dotted pattern data is shifted over the continuous tone image data entirely.

* * * * *